Patented Feb. 9, 1954

2,668,819

UNITED STATES PATENT OFFICE 2,668,819

S-(ETHYLXANTHOYL) O-(4-NITROPHENYL) METHANETHIOLPHOSPHONATE

Henry Tolkmith, Midland, Mich., assignor to The Dow Chemical Company, Midland, Mich., a corporation of Delaware No Drawing. Application April 21, 1953, Serial No. 350,232

1 Claim. (Cl. 260—455)

The present invention is directed to S-(ethylxanthoyl) O-(4-nitrophenyl) methanethiolphosphonate of the formula

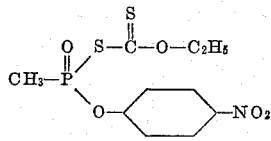

This compound is a viscous oil, somewhat soluble in many organic solvents and substantially insoluble in water. It is of value as an intermediate for the preparation of more complex phosphorus derivatives and as a toxic constituent of parasiticide compositions.

The new compound may be prepared by reacting one molecular proportion of an alkali metal ethylxanthate with one molecular proportion of O-(4-nitrophenyl) methanephosphonic chloride of the formula

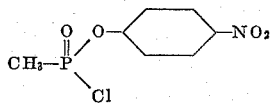

in an inert organic solvent such as benzene. In practice, sodium ethylxanthate is preferably employed as the alkali metal xanthate reactant.

In carrying out the reaction the O-(4-nitrophenyl) methanephosphonic chloride is added with stirring to the sodium ethylxanthate dispersed in the solvent and the resulting mixture thereafter heated for a period of time at a temperature of from 35° to 80° C. Since the desired product has a tendency to decompose at temperatures in excess of 80° C., temperatures substantially in excess of 80° C. for any appreciable period of time should be avoided. Upon completion of the reaction, the mixture may be filtered and the filtrate distilled under reduced pressure at gradually increasing temperatures to a temperature up to 80° C. to separate low boiling constituents and to obtain as a residue the desired S-(ethylxanthoyl) O-(4-nitrophenyl) methanethiolphosphonate.

The O-(4-nitrophenyl) methanephosphonic chloride employed as a starting material in the above described method may be prepared by reacting one molecular proportion of 4-nitrophenol with at least one molecular proportion of methanephosphonic dichloride of the formula

in an inert organic solvent. The reaction is carried out in the presence of a hydrogen chloride acceptor such as pyridine. In carrying out the reaction, the 4-nitrophenol and hydrogen chloride acceptor are dispersed in the solvent and the resulting mixture added portionwise with stirring to the methane phosphonic dichloride dispersed in the same solvent. The mixture is thereafter heated for a period of time at a temperature of from 35° to 80° C. to complete the reaction. The reaction takes place smoothly at temperatures of from 20° to 80° C. and at a rate which varies directly with the employed temperature. The reaction is somewhat exothermic, the temperature being controlled by regulation of the rate of contacting the reactants as well as by the addition and subtraction of heat, if required. Upon completion of the reaction, the mixture may be filtered and the filtrate concentrated by distillation under reduced pressure to separate low boiling constituents and to obtain as a residue the desired O-(4-nitrophenyl) methanephosphonic chloride. Distillation temperatures substantially in excess of 150° C. for any appreciable period of time should not be employed as the desired product has a tendency to decompose at such temperature. O-(4-nitrophenyl) methanephosphonic chloride is a viscous oil having a density of 1.4490 at 20° C. The latter compound and described method for its production are disclosed in my copending application Serial No. 203,758.

In a representative preparation, 20 grams (0.139 mole) of sodium ethylxanthate dispersed in 150 milliliters of benzene was added with stirring to 30 grams (0.128 mole) of O-(4-nitrophenyl) methanephosphonic chloride dispersed in 150 milliliters of benzene and the resulting mixture heated for 2 hours at a temperature of 70° C. At the end of this period, the mixture was filtered and the filtrate concentrated by distillation under reduced pressure to a temperature up to 70° C. to obtain as a residue an S-(ethylxanthoyl) O-(4-nitrophenyl) methanethiolphosphonate product. The latter is a viscous oil having a density of 1.379 at 22° C.

The new S-(ethylxanthoyl) O-(4-nitrophenyl) methanethiolphosphonate product is effective as a parasiticide and adapted to be employed for the control of a wide range of agricultural and household pests such as flies, mites, aphids, beetles, cockroaches, and Southern army worms. For such use, the compound may be dispersed on an inert finely divided solid and employed as a dust. Also, such mixtures may be dispersed in water with the aid of a dispersing and wetting agent and the resulting aqueous suspensions employed as sprays. In other procedures, the new product may be employed in oils, as a constituent in oil-in-water emulsions, or in water dispersion with or without the addition of emulsifying, wetting or dispersing agents. Suitable concentrations of the toxicant in dusts are in the order of from about 0.1 to 10 percent by weight of the dust and in liquid suspensions from about 0.1 to 3 pounds per 100 gallons of the spray mixture. In a representative operation, 100 percent kills of two-spotted spider mites and Mexican bean beetles were obtained with aqueous spray compositions containing 0.25 pound of the toxic phosphonate per 100 gallons of spray mixture.

This is a continuation in part of my copending application Serial No. 203,760, filed December 30, 1950.

I claim:

S-(ethylxanthoyl) O-(4-nitrophenyl) methanethiolphosphonate.

HENRY TOLKMITH.

No references cited.